United States Patent [19]

Leeke et al.

[11] 4,193,876

[45] Mar. 18, 1980

[54] MEANS FOR SUPPRESSING EDGE LEAKAGE IN FILTER PRESSES

[75] Inventors: Gordon Leeke, Glastonbury; Joseph W. Helme, Ellington, both of Conn.

[73] Assignee: AMF Incorporated, White Plains, N.Y.

[21] Appl. No.: 946,268

[22] Filed: Sep. 27, 1978

[51] Int. Cl.² .............................................. B01D 25/12
[52] U.S. Cl. .................................... 210/489; 210/502; 210/505

[58] Field of Search ................. 55/503, 512, 514, 516, 55/518; 210/501–505, 335, 339, 451, 495, 224, 226, 488, 489, 496, 490

[56] References Cited

U.S. PATENT DOCUMENTS 2,521,984  9/1950  Lang ..................................... 210/484

Primary Examiner—Frank Sever
Attorney, Agent, or Firm—George W. Price; Charles J. Worth

[57] ABSTRACT

Dry forming the peripheral portion of discs of filter media to suppress edge leakage in filter presses.

2 Claims, 2 Drawing Figures

MEANS FOR SUPPRESSING EDGE LEAKAGE IN FILTER PRESSES

The present invention relates generally to filter media for use in filter presses and more particularly to controlling edge leakage thereof.

Edge leakage is a common problem in filter presses which are normally provided with collection means for such leakage and obviously it is desirable to keep the leakage as low as possible. Up to this time, filter media used in such presses has been predominantly fibrous, either cellulose fibres alone or with asbestos, which filter presses can marginally provide sufficient compression to keep edge leakage within acceptable limits. It has been found that edge leakage in filter presses can be substantially reduced further or eliminated by plastic impregnation or encapsulation of the media edges. Mechanical means to limit edge leakage have also been used. However, such devices are costly, cumbersome and create additional interface problems.

The edge leakage problem has become greatly amplified with the use in filter presses of filter media containing non-compressible particulates; for example, media as disclosed by U.S. Pat. No. 4,007,113, which was granted Feb. 8, 1977, to E. A. Ostreicher and assigned to the same assignee as is the present application. Chemically sealing the edges of filter media, more often than not, creates problems such as unacceptability and/or incompatibility with liquid to be filtered. Therefore, chemically sealing and, of course, mechanical leakage suppressing means provide no appropriate solutions.

Edge leakage occurs in filter presses at the compression interfaces of the press plates and filter sheets or discs when the surfaces of the filter discs are rough and/or uneven, and also through relatively open or insufficiently compressed filter media structure due to wicking.

Accordingly, an object of the present invention is to provide a disc or plate of filter media with means for limiting edge leakage.

Another object of the present invention is the method of making the foregoing disc or plate of filter media.

The foregoing and other objects and advantages will appear more fully hereinafter from a consideration of the detailed description wherein a single embodiment of the invention is illustrated by way of example. It is to be expressly understood, however, that the drawing is for illustration purposes only and is not to be construed as defining the limits of the invention.

Figure 1:
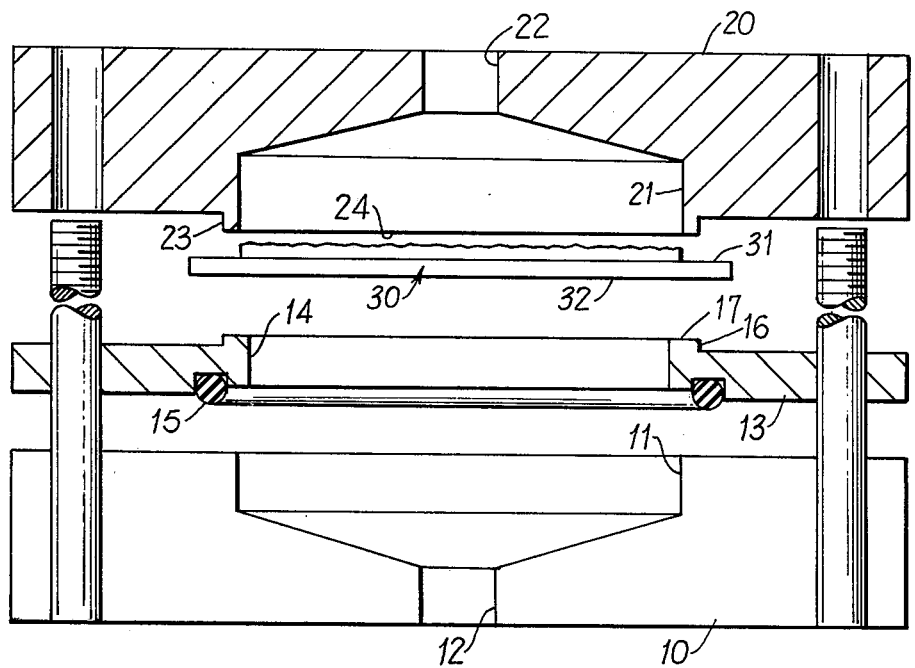
FIG. 1 is an exploded sectional view of a filter press with a plate of filter media made in accordance with the present invention and shown in elevation.
Figure 2:
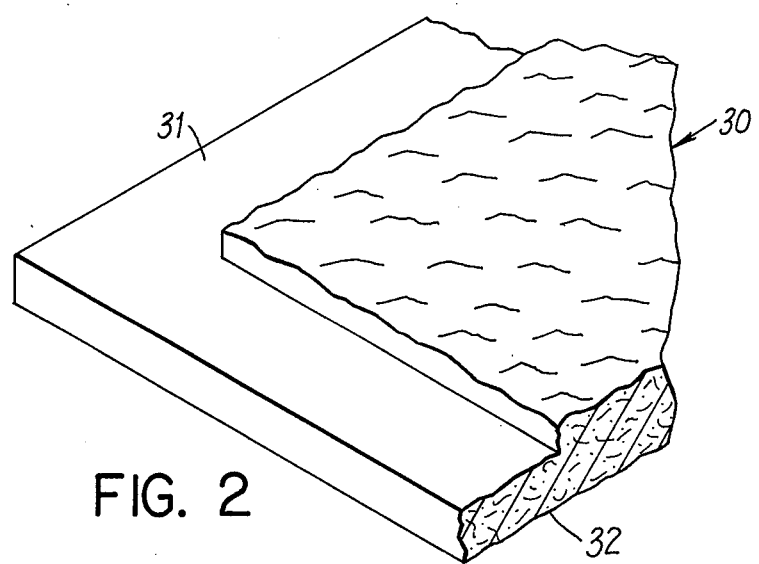
FIG. 2 is an enlarged perspective view of a portion of the filter media of FIG. 1.

Although a filter press can be positioned for flow in the horizontal or vertical plane, the present invention will be described with the press P positioned for flow in a vertical plane as shown in FIG. 1. It should be understood that the present invention is shown and will be described as embodied in a filter press utilizing a single disc or plate of filter media merely to facilitate the description, and is not intended to define any limits of the invention. The number of filter discs or plates required for any particular embodiment will be dictated by the demands the filter press will be subjected to, and the present invention will find utility in presses having single or multiple filter discs or plates. While the filter disc or plate with its flow path, and the press plates on either side thereof are shown as being rectangular, they may be of any suitable geometrical shape, which usually are circular.

Referring now to the drawings, the filter press P has three main parts, namely a fixed base 10 with a base or intermediate plate 13, and a cover or top plate 20 to be connected together when the press is assembled by a series suitable fastening means such as the studs and nuts, as shown.

The base 10 is provided with a large central cavity 11 flow connected with a bottom discharge 12 for the filtered liquid. The base 10 and the plate 13 may be made as a single piece. However, it is preferable to separate the plate 13 from the base 10 to facilitate alignment of its annular seal face 17.

The bottom surface of the plate 10 is provided with a central recess encircled or surrounded by an O-ring seal 15, which engages the adjacent surface of the base 10 and encircles or surrounds the cavity or flow path 11 when the filter press P is assembled, thereby forming a seal between the base 10 and plate 13. The plate 13 is provided also with a central opening or flow path 14 similar in size and shape to the cavity 11, and axially aligned therewith when the filter press P is assembled. The top or upper surface of the plate 13 is provided with an outwardly extending flange or lip 16 which encircles or surrounds the opening 14 and provides a sealing face 17.

The cover or top plate 20 is provided with a central cavity or flow path 21 which corresponds in size and shape to the cavity 11 and is flow connected to an inlet 22 to receive liquid to be filtered. The bottom or inner surface of the cover 20 is provided with an outwardly extending flange or lip 23 which encircles or surrounds the open end of the cavity 21 and provides a seal face 24 which is axially aligned with the seal face 17.

When the filter press P is assembled, the cavities 11 and 21 with the opening 14 combine to form a flow through filter chamber which is divided into inlet and outlet portions by a disc or plate of filter media 31 which is clamped between the plates 13 and 20. The opposed seal faces 17 and 24 engage and form seal interfaces with opposite sides of the filter plate or disc 30 and compress the filter media therebetween to close the normally open internal structure to thereby suppress edge leakage. However, it has been found that the compression between the faces 17 and 24 is insufficient to reduce edge leakage of filter media with non-compressible particulates to acceptable limits, and only provides limited suppression of edge leakage of cellulose and cellulose-asbestos filter sheets or plates.

To maintain the flow-through characteristics, the open structure of the filter media within the formed filtering chamber or flow path is required, while to suppress edge leakage the filter media must be densified or sealed. Therefore, a filter disc or plate with a normal or undisturbed center portion which is encircled or encompassed by a densified flange portion is required.

The filter media normally is made in sheet form which are then dried, and at this time, the filter discs or plates are cut from such sheets. In accordance with the present invention, a disc or plate of filter media in a dry state is put into a form and the peripheral portion of the disc or plate which will extend outwardly from the formed filter chamber is subjected to a compression or compacting pressure which now forms a high density flange defined by the media between the filter surfaces 31 and 32. Not only is the filter media densified, this dry forming or precompression evens out any roughness or irregularities of the surfaces 31 and 32 which are to be engaged by the faces 24 and 17, respectively and the leakage at the formed interfaces and internally due to wicking is substantially reduced and approaches a no leakage condition.

More edge leakage suppression can possibly be obtained under certain conditions by precompressing filter disc or plates when wet than when in the dry state. However, when wet, the sheets are hard to handle and it is difficult to maintain the integrity of the formed flange. While edge leakage changes inversely to precompression pressure, it has been found that a precompression pressure sufficient to reduce the thickness of the formed flange to approximately fifty percent of the original sheet thickness will reduce the edge leakage to within commercially acceptable limits. It also noted that leakage suppression is enhanced by the width of the precompressed flange which should be at least twice the width of the sealing interface formed by the flange surface and the seal face of the press plate which engages the flange surface.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A liquid filter for disposition between adjacent plates of a filter press and having axially aligned central flow path openings and opposed seal faces encircling said openings, comprising a disc of predetermined size and shape of a sheet of filter media including fibrous cellulose and non-compressible mineral particulate material of predetermined concentration and particle size;

means for substantially eliminating edge learage due to wicking when said filter is disposed between said plates, said means, consisting of a flange portion extending outwardly from the flow path openings when retained between plates of a filter press, and said flange being dry pressed prior to use, to a density corresponding to a thickness approximately one half of its original thickness, said flange having sufficiently smooth surfaces to be engaged by and forming sealing interfaces with the opposed seal faces of the filter press plates to suppress edge leakage.

2. The filter in accordance with claim 1, and said flange having a width at least twice the width of the interface formed by the surface of said flange and the seal face of a filter press plate engaging said surface.

* * * * *